United States Patent [19]

Littleton et al.

[11] Patent Number: 4,709,719
[45] Date of Patent: Dec. 1, 1987

[54] AUTOMATIC CUP PIG LAUNCHING AND RETRIEVING SYSTEM

[75] Inventors: Jody Littleton, Brighton; Gary W. Davis, Broomfield, both of Colo.

[73] Assignee: Tamworth, Inc., Broomfield, Colo.

[21] Appl. No.: 941,400

[22] Filed: Dec. 15, 1986

[51] Int. Cl.$^4$ .............................................. B08B 9/06
[52] U.S. Cl. ............................. 137/268; 15/104.06 A
[58] Field of Search .................. 137/268; 15/104.06 A

[56] References Cited

U.S. PATENT DOCUMENTS 3,232,090  2/1966  Walker ............................ 137/268 X
3,779,270  12/1973  Davis .................................. 137/268
4,199,834  4/1980  Muchow ...................... 15/104.06 A Primary Examiner—Alan Cohan
Attorney, Agent, or Firm—Gunn, Lee & Jackson

[57] ABSTRACT

Apparatus for launching and retrieving cup pigs in pipelines. A vertically oriented pig launching barrel is isolated from pipeline pressure, blown down to atmospheric pressure and then loaded with a number of cup pigs. After the pig launching barrel has been sealed and equalized with line pressure it is placed in pig launching communication with the pipeline. Holding and launching rams are then actuated automatically in accordance with a timed sequence or selectively under manual control to cause sequential or selective gravity and flow induced launching of cup pigs into the pipeline. Following passage through the pipeline the cup pigs are separated from the flowing fluid by a pig receiving barrel which is also capable of containing a number of cup pigs.

18 Claims, 4 Drawing Figures

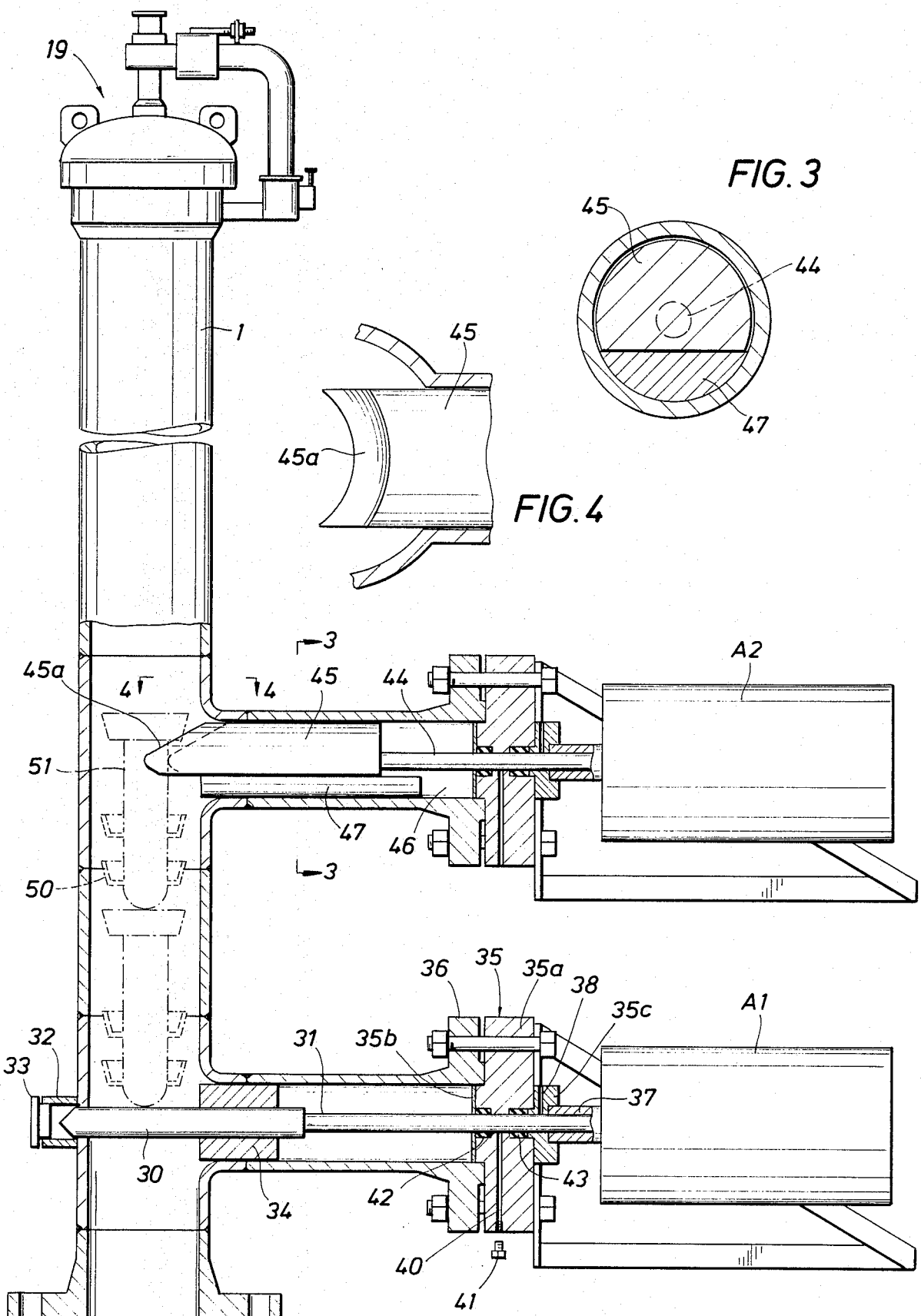

AUTOMATIC CUP PIG LAUNCHING AND RETRIEVING SYSTEM

FIELD OF THE INVENTION

This invention relates to apparatus for accomplishing manual or automatic launching of cup pigs into a pipeline for the purpose of improving operation by reducing pressure loss, reducing corrosion, removing corrosion products and separating dissimilar fluids in a single pipeline. More specifically, the present invention is directed to apparatus for storing a number of cup pigs and accomplishing automatic or selective launching thereof in sequential manner.

BACKGROUND OF THE INVENTION

The movement of natural gas in a gathering system pipeline poses a major problem when the gas cools to ground temperature, causing heavy hydrocarbons to condense to the liquid phase. The condensate collects in draws, low points in the line, creating pressure loss as the gas attempts to lift the condensate fluid. As the quantity of fluid increases, pressure loss increases consequently reduce the quantity of gas that can be transported in the pipeline. When condensate fluid is present in enough quantity to "trap" a draw, the gas flow will raise the fluid until it can break free. After the gas flows by the fluid, the fluid will have a tendency to descend back into the draw. This back and forth fluid action can continue for extensive periods of time and can cause mechanical erosion of the pipeline in the low area. Any water present in the fluid will promote chemical corrosion in the pipeline, depositing corrosion products which build up and promote the corrosion process. In order to remove this condensate liquid from the draws, it is common pipeline practice to utilize the force of the moving gas to force a spheroid through the line causing the pressure of the gas stream to move it. The spheroid, or ball pig, actually forces the condensate out of the line and thus prevents it from flowing back into the draw by gravity action.

A spheroid, or ball pig, has many major disadvantages when compared with a cup pig. A ball pig is commonly formed from hollow rubber or elastomer shells which are filled under presssure with fluid to establish the outside diameter of the ball. Inside the pipeline, the ball can be deformed by the gas pressure, allowing gas and condensate to slip by the ball pig or spheroid and flow back into the low area. In such case obviously a ball pig only removes a part of the condensate from the line which results in the necessity for frequent pigging in order to keep the flow line reasonably clear. The ball pig has only one circular point of contact with the flow line, affording a poor sealing system. Ball pigs also tend to hang up in the system, resulting in unreliable receiving frequency, even with flawless launching. In comparison, cup pigs can have five or more circular points of contact with the flow line, with gas pressure actually forcing the cups to expand radially outwardly against the inner surface of the pipeline, thereby forming an excellent seal. The cups of the pig can expand or contract as necessary to compensate for small changes in pipeline diameter. Cup pigs are typically enabled to move easily through telescoped pipelines, short radius welled ells, mitered joints, tees, valves, dents and deformed pipe without becoming lodged in the system. The advanced sealing of cup pigs is particularly important when a cup pig is utilized to separate dissimilar fluids being transported in the same pipeline. The major advantage of ball pigs is the large number of ball launching and receiving devices that are commercially available for inserting the ball pigs into the pipeline and subsequently removing them from the pipeline. There is a need in the industry for an efficient mechanism to launch and receive cup pigs, manually or automatically, thus allowing their use in a wider range of pipeline applications. The present invention is therefore directed to a mechanism for launching and retrieving cup pigs, which mechanism is capable of being operated manually or automatically according to the desires of the user.

SUMMARY OF THE INVENTION

It is therefore a principal feature of the present invention to provide an efficient and reliable mechanism to launch cup pigs into pipelines and retrieve them at some downstream point without disturbing the flow of the pipeline.

It is a further feature of this invention to provide novel apparatus for launching and retrieving cup pigs which utilizes commonly available pig launching concepts in a novel manner to allow handling of the unique shape of a cup pig.

It is yet another feature of this invention to employ novel apparatus for launching and retrieving cup pigs which apparatus incorporates a holding ram and a launching ram which are sequentially operated with selective or automatic control to accomplish sequential movement of pigs into a pipeline and which apparatus is designed to minimize internal moving parts and sealing points.

Still another feature of this invention is the provision for novel cup pig launching and retrieval apparatus which is efficiently designed for reliable operation in pipeline service wherein the fluid controlled by the pipeline is at high pressure, is dirty or contains significant volumes of corrosive gases and liquids.

It is also an important feature of this invention to provide novel apparatus for launching and retrieving cup pigs which is designed to permit various options for actuating the holding and launching rams thereof. These options include electric drive, pneumatic drive and hydraulic drive systems which can be effectively adapted to impart pig holding and launching movement to the rams. The actuating system can be initiated by a timing mechanism, a radio signal or a manual input from an operator.

A further feature of this invention concerns the provision of novel launching and retrieval apparatus for cup pigs wherein pigs are combined with the pipeline fluid or extracted from the pipeline fluid in sections of pipe with a larger diameter than the pig and wherein both gravity and fluid flow are utilized to inject the pig into and separate the pig from the pipeline fluid.

A final feature of this invention concerns the provision of a novel pig launching and retrieval system which provides operating personnel with a safe and efficient means for loading and unloading cup pigs in pig launching and retrieval barrels.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings, which drawings form a part of this specification.

It is to be noted, however, that the appended drawings illustrate only typical embodiments of this invention and are therefore not to be considered limiting of its scope, for the invention may admit to other equally effective embodiments.

IN THE DRAWINGS

Figure 1:
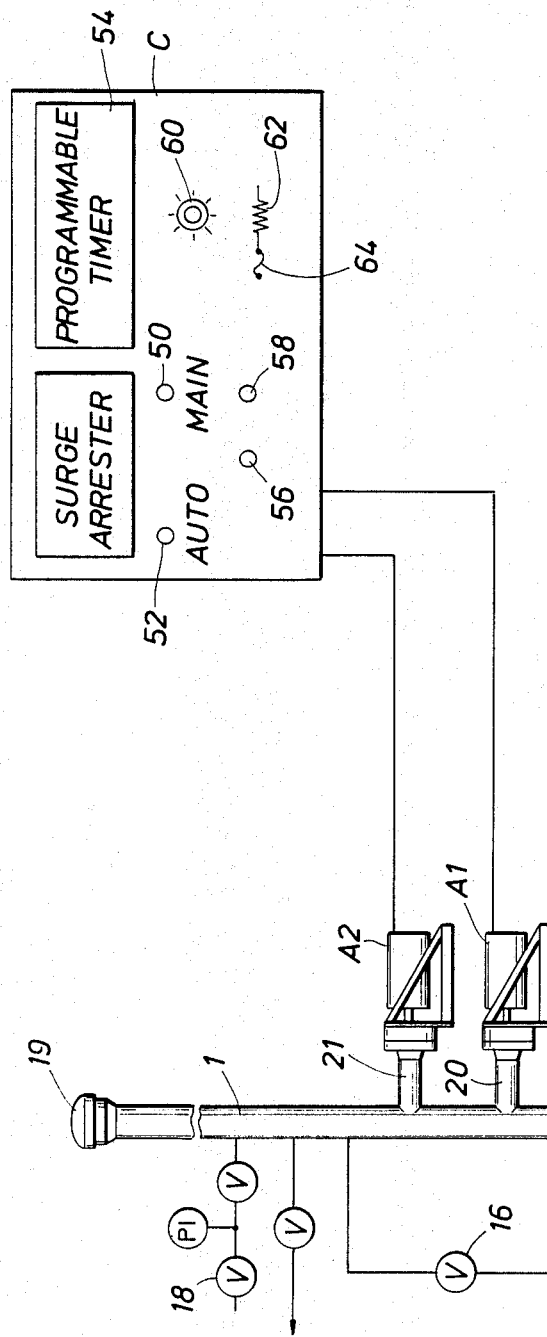
Figure 1:
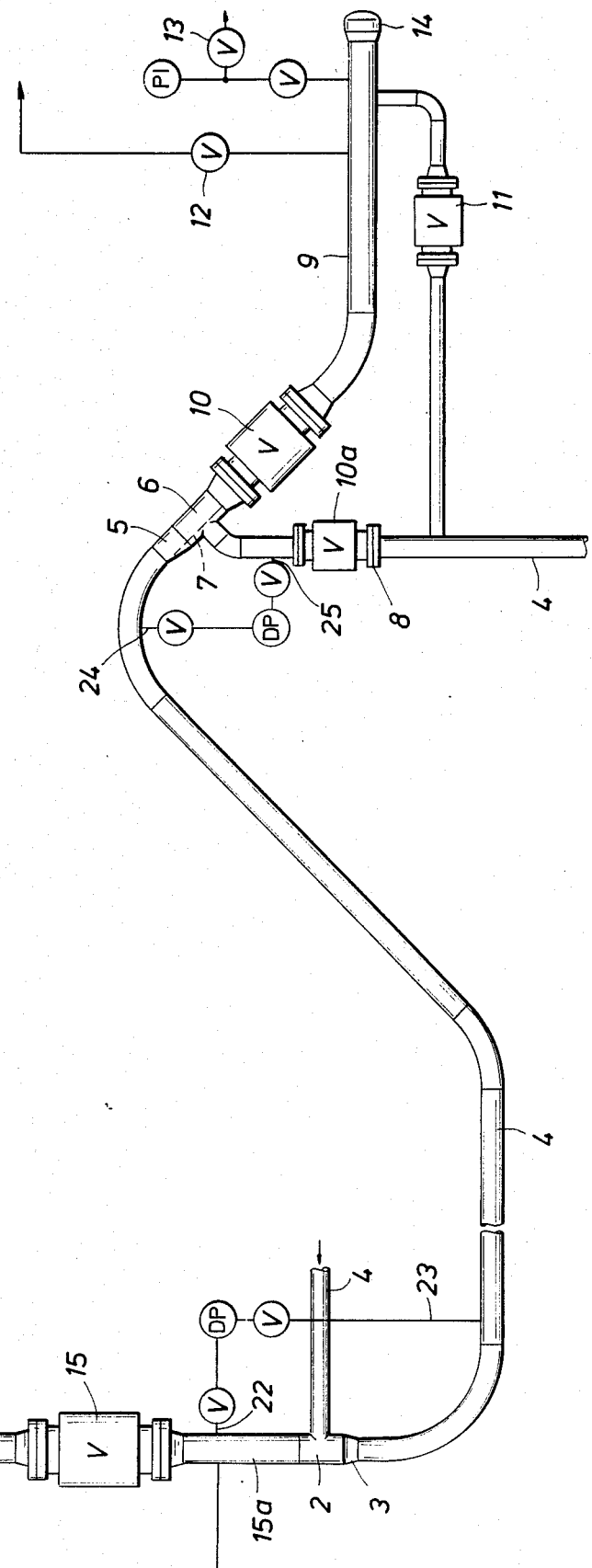

FIG. 1 is a schematic piping illustration showing a cup pig launching and retrieval system constructed in the courts with the present invention, which system is shown interconnected with a pipeline through which cup pigs are caused to pass.

FIG. 2 is a partial sectional view of the cup pig barrel of the apparatus of FIG. 1 illustrating the holding and launching rams thereof and with operational and control apparatus therefore illustrated by way of schematic diagram.

FIG. 3 is a sectional view taken along line 3—3 of FIG. 1.

FIG. 4 is a fragmentary sectional view taken along line 4—4 of FIG. 1.

DETAILED DESCRIPTION OF PREFERRED EMBODIMENT

Referring now to the drawings and first to FIG. 1 a launching barrel is generally illustrated at 1 which is adapted for efficient storage of a number of cup pigs and for sequential launching of the cup pigs into a pipeline. Element 2 is a tee which is interconnected with the pipeline P by means of concentric reducer 3. A pig being injected into a line will first be moved into the concentric reducer and due to the restriction, will lodge in the concentric reducer until the fluid pressure upstream of the pig builds sufficient pressure differential to force the cup pig through the concentric reducer and into the pipeline 4. The cup pig will then be forced through the pipeline under the influence of fluid pressure until it reaches an eccentric reducer 5. At the end of the pipeline the cup pig and the fluid enter the eccentric reducer at a reducing tee 6. Within the eccentric reducer and reducing tee is provided pigging bars 7 to force the cup pig to travel toward a receiving barrel 9. The pigging bars allow fluid to flow transversely toward the continuation of the pipeline 4 while the pig is guided by the pigging bars past the pipeline connection and into the pig receiving barrel 9. A restriction orifice 8 is installed into the pipeline downstream of the pipeline isolation valve 10a and has the purpose of forcing approximately 30% of the fluid flow through the receiving barrel 9 to transport the cup pig past an isolation valve 10 and into the receiving barrel. When the receiving barrel is full of cup pigs operating personnel will close the isolation valve 10 and equalization valve 11 and will then accomplish depressurization of the receiving barrel through a flare blow down valve 12. To insure that the receiving barrel is totally depressurized before opening the quick opening closure 14 operating personnel can also open an atmospheric blow down valve 13. With safety assured, the operating personnel will then open the quick opening closure 14 gaining access to the pig receiver barrel for removal of the pigs contained therein. To place the receiving barrrel back in service, operating personnel will then close the quick closure 14 and will insure that both of the blow down valves 12 and 13 are closed. The pressure equalization valve 11 is then opened, whereupon fluid under pressure within the pipeline will enter the receiving barrel, raising its pressure to line pressure. After the pig receiver barrel is equalized with the line pressure the main isolation valve 10 will be opened and the receiver barrel will then be readied for receiving additional pigs. The pigs removed from the receiver barrel are then cleaned and transported to the pig launching facility.

With regard to the pig launcher it should be born in mind that the pig launching barrel will be positioned vertically or nearly so, thereby permitting pigs located therein to descend by gravity toward the point of launching. In order to accomplish loading of the launcher barrel a main isolation valve 15 is closed and operating personnel will then inspect the apparatus to insure that the pressure equalization valve 16 is also closed. The launcher barrel is then depressurized through a flare blow down valve 17 and then an atmospheric blowdown valve 18 is opened to insure complete depressurization of the barrel. After operating personnel have opened the quick opening closure 19 the launcher control panel is placed in the manual mode. Operating personnel should confirm at this point that the launching ram 20 is extended to its pig supporting position and the holding ram 21 is retracted. The cup pigs are then loaded into the barrel from the upper end thereof and the holding ram 21 is extended. After this has been done the quick closure 19 is closed and sealed. Both of the blow down valves 17 and 18 are then closed to prevent escape of pressure from the launching barrel and the equalization valve 16 is opened to permit line pressure access to the launching barrel. After the pressure within the launching barrel is equalized with the pressure in the pipeline, the main isolation valve 15 is opened, thereby permitting movement of the pigs from the launching barrel through the open isolation valve 15 and through a launching pipe 15a to the tee 2 and concentric reducer 3 as launching occurs. The final step in the loading procedure to ready the launching barrel for service is to place the circuitry of the control panel in the automatic mode as will be described in detail hereinbelow.

Pressure taps are provided upstream 22 and downstream 23 of the concentric launching reducer 3 for the installation of a differential pressure switch DP. Similar pressure taps are provided upstream 24 and downstream 25 of the eccentric receiving reducer 5. The differential pressure required to move the cup pig down the pipeline is sensed by the differential pressure switch and an appropriate switch signal can be sent to any appropriate receiving device to provide operating personnel with confirmation that a cup pig has been launched and received on schedule. Appropriate valving is provided for isolation of the differential pressure switch lines from the pipeline so that servicing operations may be conducted without shutting down the flow line.

Referring now to FIG. 2 of the drawings, a detailed description of the cup pig launching mechanism is disclosed. The launching barrel 1 is provided with a launching ram 30 which, in the case shown in the drawings, is defined by a cylindrical bar with a tapered point at one end while the other end thereof is drilled and tapped for connection with a drive rod 31. When the launching ram is extended it is supported at each end thereof to prevent damage to the drive rod 31 and the sealing mechanism 35 when cup pigs are dropped into the launching barrel 1. A threaded member 32 is secured to the exterior of the launching barrel such as by welding and a closure plug 33 is provided to close its outer extremity. The pointed end of the launching ram 30 extends through an aperture formed in the wall of the launching barrel and projects into a small chamber defined by threaded member 32 mounted externally of the barrel and typically referred to as a thread-o-let. The threaded member and plug 33 are provided to permit support of the free end of the launching ram by the wall structure of the launching barrel to thus allow accurate alignment of the launching ram 30 with a guide ring 34 and a drive rod seal mechanism shown generally at 35. The plug member 33 also allows visual assurance of the fit of the pipe and the launching ram along with the stop point of the launching ram. As the launching ram is retracted by the launching actuator shown schematically at A1 the launching ram slides through the guide ring 34 which provides enough bearing and support capability to allow the launching ram to hold the weight of a cup pig without causing flexing of the drive rod 31. When the launching ram is fully retracted into the guide ring 34 the lowermost cup pig is free to descend by gravity toward the concentric reducer as mentioned above. All of the square edges are chamfered to prevent dragging of moving parts and to insure that there is no place for the cup pig to hang up. The drive rod 31 has a small diameter to minimize the required power of the actuator to extend the ram against the pressure in the launching barrel. The small diameter of the drive rod 31 also minimizes the rod circumference to be sealed by the packings 42 and 43 to thus prevent gas leakage from the launching barrel to the atmosphere. The seal assembly 35 is attached to the launching barrel by bolting it to a standard four inch 600 pound ANSI flange 36. Obviously, the flange 36 may be of any other design or construction without departing from the spirit and scope of this invention. The sealing assembly consists of a main seal housing 35a, a primary seal support plate 35b and a secondary seal packing gland 35c. The packing gland 35c also serves to retain the front support structure 37 of the launching ram actuator A1 37 in assembly with the pig launching barrel.

The packing assembly of the apparatus includes a primary packing seal and wiper 42 which are secured within a packing chamber by means of the retainer plate 35b. The retainer plate is secured to the main seal housing 35a by means of bolts (not shown) thereby allowing easy replacement of the seal member in the event leakage should occur. The main seal housing 35a is drilled to form a relief passage 40 which permits any fluid leaked past the primary seal 42 to be vented to the atmosphere. Vent passage 40 enables operating personnel to visually inspect the apparatus and determine if seal leakage is occurring. If minimal leakage is observed, maintenance can be scheduled at an appropriate time. If the primary seal is leaking excessively, the vent passage 40 may be closed by a plug 41 which is shown in FIG. 2 to be separated from the external threaded portion of the vent passage. In the event the vent passage is plugged the packing member 43 becomes the primary seal to positively prevent leakage until such time as service operations can be conducted for replacement of the leaking seal member 42. The packing assembly 43 is squeezed in the packing chamber defined between the main seal housing 35a by a seal packing gland 35c. As the packing 43 becomes worn, the packing gland can be adjusted inwardly toward the packing, such as by adjustment bolts, to increase its compression and effect additional sealing. The seal packing gland 35c is also drilled to form a vent passage 38 to allow venting of any fluid that may leak past the packing 43. The vent passage 38 is not adapted for plugging; thus when leakage occurs at vent passage 38 the leaked fluid will be vented to the atmosphere and will not be forced by line pressure into the actuator A1. As soon as leakage is observed at the vent passage 38 the pig launching system must immediately be scheduled for repair by replacement of the seal 42 and packing 43.

Following loading of the launching barrel 1 the holding ram 21 is left retracted for a period of 30 seconds or so to insure that the lowermost cup pig has descended past it to rest on the launching ram 20. The circuitry of the control panel then automatically sends a signal to the holding actuator A2 causing it to extend the holding ram to prevent other pigs in the launching barrel from descending during launching of the lowermost pig. When the holding ram is fully extended a signal is sent to the control panel and the pig loading sequence is initiated.

To load a cup pig into the launching chamber the timing sequence of the control panel sends a signal to the upper actuator A2 causing the upper actuator to initiate its retraction movement. The actuator imparts retraction movement to its drive rod 44, forcing the drive rod to move through a sealing assembly which is identical to the sealing assembly 35 described above in connection with the launching ram. The drive rod 44 is attached to a holding ram 45 by means of a threaded connection or any other suitable means of attachment. As the holding ram is retracted out of the launching barrel and into its holding chamber 46 the holding ram slides on a support plate 47 which is fixed within the pipe forming the holding chamber. Even though it is recommended that operating personnel retract the holding ram 45 before loading pigs, the length of the ram, coupled with the close tolerances allowed for the fit of the ram 45 to the slide plate 47 and the pipe, will prevent damage occurring to the rod or seals if a pig is dropped on the extended holding ram. When the holding ram is fully retracted, the pig stack in the launching barrel 1 is free to descend by gravity to the extended launching ram 30. The holding ram 45 remains retracted for 30 seconds or so as a precautionary measure, then the control panel circuitry sends a signal causing actuator A2 to extend the holding ram. As the holding ram 45 enters the launching barrel 1 a concave area defined by the tapered front portion 45a of the holding ram tends to center the pig and then forms a forked area which functions as a hanger for the pig cups. If the launching ram does not center the pig 52 properly or if it happens to engage a cup 50 rather than the shaft 51 of the pig, the pig is merely pressed against the wall of the launching barrel opposite the holding ram and is still retained in the proper position for launching. When the holding ram is fully extended the cycle is complete. The control panel timer counts down for the start of the new launch cycle.

The pig storage magazine or barrel of the pig launching apparatus includes a barrel dimension which is one standard pipe diameter larger than the pipeline into which cup pigs are to be injected. The launching barrel is mounted vertically above a full opening isolation valve having a flow port of substantially the same diameter of the internal diameter of the launching barrel.

A section of pipe 15a is located between the isolation valve 15 and the tee member 2 and is of substantially the same internal dimension as the launching barrel. The vertical run of the tee member is also of substantially the same large internal dimension as that of the pipe section 15a, thus enabling the pig to descend by gravity to the concentric reducer 3 where it is introduced into the flowing fluid from the pipeline 4. The pig constricts the pipeline at the concentric reducer and thus a pressure differential quickly builds up, developing a force urging the pig into the smaller dimension of the pipeline 4. This force squeezes the pig cups peripherally and causes the cups to engage the inner surface of the pipeline. The pressure of the flowing fluid acts on the cups of the pig, causing them to yield radially outwardly and maintain an effective seal with the pipeline as the pig is moved through the pipeline.

The launching barrel is provided with a quick opening closure 19 of any suitable character enabling operating personnel to open it quickly and safely for the purpose of loading the launcher barrel with a number of cup pigs. Since cup pigs will not roll, gravity cannot by itself be used to move the pigs into the receiver barrel. At a desired location along the length of the pipeline 4 a special pig receiver barrel 9 is employed utilizing gas flow and gravity to remove the pig from the flowing fluid and direct it into the receiver barrel. The receiver barrel can then be isolated and blown down to retrieve the pigs. This is accomplished by closing the full opening isolation valve 10 and closing equalization valve 11, thus isolating the pig retriever barrel from the pressure of the pipeline. Thereafter flare blow down valve 12 is opened to relieve pressure within the retriever barrel. After this has been done the quick opening closure 14 may be opened thus permitting the pigs collected within the retriever barrel to be unloaded. After cleaning, the pigs are then transported to the pig launching barrel for reuse. The pig retriever barrel may be positioned as shown in FIG. 1, with the eccentric reducer 5 and the tee 6 inclined downwardly. Though the seal of the pig is broken at the eccentric reducer its travel into the receiver barrel 9 is aided by gravity and by the volume of fluid flowing through the retriever barrel and re-entering the pipeline 4 by way of the pressure equalization line and valve 11. The pigs within the barrel 9 are sufficiently smaller than the internal dimension of the retriever barrel that fluid readily flows past them to the equalization line.

Internal moving parts of the cup pig launching mechanism are machined from a corrosion resistant material such as 304 stainless steel. The sealing mechanism contains a wiper gland, a primary mechanical seal, a pluggable seal leak indicator, followed by a secondary seal (rope packing), and a non-pluggable seal leak indicator. The pig launcher is mounted above a full opening valve (any standard manufacturers' valve with proper pressure and corrosion specifications) for isolation of the launching barrel from the pipeline, providing the best possible safety situation for field personnel operating the pig launching system.

Safety and efficiency of operation are always prime considerations involving high-pressure pipeline systems. To this end, the launching barrels are provided with pressure gauges, blow down lines and valves to a flare system, and an atmospheric blow down valve. To allow easier opening of the large isolation valves on the launching barrel after depressurization has occurred, a pressure equalization loop is provided having a smaller equalization valve such that the pressure across the large valve can be equalized before it is required to open. This feature also facilitates extended service life of the large isolation valves.

Control panel C will be provided with electrical circuitry for manual control which is energized upon closure of a manual actuator switch 50. Appropriate circuitry is also provided for automatic control which is energized by a switch 52. A single double pole selector switch may be employed for selections of the automatic and manual modes of the control circuitry. The automatic circuitry is programmable by means of a program timing circuit such as indicated at 54. For manual control, after the manual circuit has been selected by closing switch 50 actuator switches 56 and 58 may be manually operated for selectively shifting the holding and launching rams of the cup pig launcher. The circuitry of the control panel is also provided with other desired features such as a pigs per day selector 60 which allows operating personnel to select the number of pigs that are to be injected into the pipeline system during any 24-hour period. The automatic control circuitry of the control panel will then inject the pigs into the pipeline at particularly spaced periods during each 24-hour period. It is then only necessary for operating personnel to select the number of pigs to be launched and the sequence of launching. The apparatus will function automatically without operating personnel being present. Since changing the pigs per day selector will automatically initiate a launch at a particular time, operating personnel must be cautioned to de-energize the manual control circuit by appropriate positioning of switches 50 and 52 before moving the pigs per day selector switch to a desired position. If for any reason a ram has initiated movement, operating personnel must leave all switch positions in their present state, for changing switch positions could leave a ram in a mid-cycle position causing faulty performance and possible manual power inputs to reinstate the ram to a desired position. Once a launch cycle has been initiated, the launch cycle must be allowed to be completed under automatic control or PC malfunction and undersired ram functioning may occur. To initiate winter time panel heating the control panel C is provided with a heater tape 62 which is connected to power and control circuitry through one or more fuses 64. Operating personnel must insure that the fuse 64, which may have been removed from the circuit during warm weather conditions, has been replaced. It is envisioned that fuses may be mounted on a handle structure and may always be present in the control panel. Thus, operating personnel simply will actuate the handle of the fuse holder to shift the fuse to its desired connected or disconnected position relative to the power and control circuitry.

AUTOMATIC OPERATION

To pre-set the control panel for automatic launching operating personnel will set the holding ram switch and launching ram switch to their off positions. The auto/manual switch or separate automatic and manual switches are appropriately positioned to place the control circuitry under manual control. Operating personnel will then select the number of cup pigs to be launched daily with the designated selector switch of switch circuit 60. To initiate the first launching sequence and the automatic timing sequence operating personnel will position the manual and automatic switches 50 and 52 at the automatic position. Launch sequences will the be initiated at equally spaced intervals during the following 24-hour period. For example at one selector setting cup pig launches will be initiated at 12-hour segements during the 24-hour period. Alternatively, the selectors may be positioned to initiate four equally spaced launches of cup pigs during a 24-hour period. The circuitry may also be arranged to permit launching of a pig only after a pig retrieval signal has been received, thus indicating a clear line between the pig launching and retrieval apparatus.

MANUAL OPERATION

Operating personnel will pre-set the selector switches of the holding and launching rams to the respective off positions thereof. It should be borne in mind that selector switches 56 and 58 may conveniently take the form of a single selector switch with an intermediate neutral position. The manual/automatic selector switch or switches 50 and 52 are positioned at the respective manual positions thereof. To initiate manual launches of cup pigs the launcher is loaded by moving the selector switch to the open position and waiting a period of time until a visual indicator light indicates that movement of the holding ram has been completed. After the holding ram has been retracted from the launching barrel obviously the lower most pig will descend to the closed launching ram 30. After this has been done the manual control switch for the holding ram is then moved to its closed position thereby causing the actuator A2 to shift the holding ram 45 to its holding position within the launching barrel. Another visual indicator such as an amber pilot light will be energized when the holding ram has reached its holding position. The switch for the holding ram is then moved to its off position. The switch for the launching ram is then activated to its retracted or launching position thereby causing actuator motor A1 to retract the drive shaft 31 and the launching ram 30. Upon retraction of the launching ram the lower most pig is allowed to descent through the isolation valve to the level of the concentric launching reducer where it is then forced into the flow line by the force of the flowing fluid. The launching ram is then extended to the position shown in FIG. 2 by appropriate activation of the control circuitry and actuator motor A1.

What is clamed is:

1. Apparatus for launching cup pigs into a pipeline, comprising:
   (a) a generally vertically oriented launching barrel of a height sufficient to contain a plurality of cup pigs, said launching barrel having an internal diameter greater than the internal diameter of the pipeline;
   (b) an isolation valve connected to said launching barrel and having a flow port of substantially the same internal dimension as said launching barrel;
   (c) a holding ram located intermediate the upper and lower extremities of said launching barrel and being movable to a pig holding position within said launching barrel and a pig release position permitting downward movement of cup pigs within said launching barrel;
   (d) a launching ram located between said holding ram and said isolation valve and being spaced below said launching ram sufficiently that a single cup pig will be received between said holding ram and said launching ram, said launching ram being movable to an extended position blocking downward movement of a cup pig within said launching barrel and a retracted position permitting downward movement of cup pigs;
   (e) a pipe section located below said isolation valve and having substantially the same internal dimensions as said launching barrel;
   (f) a connection member in the form of a pipe tee coupled in fluid receiving relation with said pipeline and having a straight through passage of substantially the same internal diameter as said pipe section and having a branch connector coupled with said pipeline, said connection member combining a launched cup pig into fluid flowing from said pipeline and permitting fluid pressure induced transport of said cup pig through said pipeline;
   (g) a concentric launching reducer having a large end coupled in fluid receiving relation with said connection member and having a small end coupled in fluid supplying relation with said pipeline; and
   (h) differential pressure detector means sensing pressure of flowing fluid upstream of said connection member and downstream of said concentric launching reducer and providing a signal indicating passage of a launched cup pig into said pipeline.

2. Apparatus as recited in claim 1, including pressure equalizing means coupled upstream and downstream of said isolation valve and being operative to equalize said launching barrel with line pressure prior to opening of said isolation valve.

3. Apparatus as recited in claim 1, including means for selectively venting said launching barrel to atmospheric pressure with said isolation valve in the closed position thereof and ensuring an atmospheric pressure within said launching barrel prior to opening of said launching barrel.

4. Apparatus as recited in claim 1, wherein said holding ram forms a concave pig centering extremity for centering and holding a cup pig within said launching barrel and for forcing the cup pig against the inside surface of said launching barrel to minimize vertical friction acting on said holding ram.

5. Apparatus as recited in claim 4, wherein:
   (a) a passage extends transversely from said launching barrel;
   (b) a support member is located within said transverse passage; and
   (c) said holding ram is supported and guided by said support member.

6. Apparatus as recited in claim 5, wherein:
   (a) a tubular member is fixed to said launching barrel and forms said transverse passage;
   (b) packing means is secured to said tubular member;
   (c) an actuator shaft is connected to said holding ram and extends through said packing means; and
   (d) a holding ram actuator is operatively connected to said actuator shaft and imparts movement thereto for shifting said holding ram within said transverse passage and into said launching barrel.

7. Apparatus as recited in claim 1, wherein:
   (a) said launching barrel forms launching ram receptacle means;
   (b) said launching ram defines a free extremity which is receivable in supported and aligned relation within said launching ram receptacle means.

8. Apparatus as recited in claim 7, wherein:
   (a) said launching barrel defines an aperture opposite said launching ram; and
   (b) said launching ram is receivable in supported relation within said aperture.

9. Apparatus as recited in claim 8, wherein:
said free extremity of said launching ram is of tapered configuration defining a point.

10. Apparatus as recited in claim 7, wherein:
(a) a passage extends transversly from said launching barrel below said holding ram;
(b) a guide bushing is disposed within said passage and receives said launching ram in movable guided relation therein;
(c) a drive rod extends from said launching ram through said passage; and
(d) launching actuator means is operatively connected to said drive rod and imparts reciprocating movement to said drive rod and launching ram.

11. Apparatus as recited in claim 1, wherein:
(a) a passage extends transversly from said launching barrel;
(b) a support member is located within said transverse passage;
(c) said holding ram is supported and guided by said support member.
(d) a tubular member is fixed to said launching barrel and forms said transverse passage;
(e) packing means is secured to said tubular member;
(f) an actuator shaft is connected to said holding ram and extends through said packing means; and
(g) a holding ram actuator is opeatively connected to said actuator shaft and imparts movement thereto for shifting said holding ram within said transverse passage and into said launching barrel.

12. Apparatus as recited in claim 11, wherein:
(a) first and second tubular elements extend transversely from said launching barrel and define first and second passages respectively, said launching ram being movable within said first passage and said holding ram being movable within said second passage;
(b) seal assembly means being secured to each of said tubular elements and forming closure therefor;
(c) first and second actuator mechanisms being supported respectively by said first and second tubular elements; and
(d) drive rod means extending in sealed relation through each of said seal assembly means and being connected with respective launching and holding rams and with said first and second actuator means.

13. Apparatus as recited in claim 12, wherein said seal assembly means comprises:
(a) seal body means being secured to said tubular elements and forming primary and secondary seal chamber means each having a seal assembly therein establishing a seal with respective ones of said first and second drive rods, said seal body means defining vent means venting any fluid leaked past said primary and secondary seal assemblies; and
(b) means selectively closing vent means of said primary seal assembly and requiring sealing to be maintained by said secondary seal assembly, said vent means of said secondary seal assembly being open at all times to prevent leaked fluid past said secondary seal assembly from entering said actuator means thereof.

14. Apparatus as recited in claim 13, including:
primary and secondary seal retainer means securing said first and second seal assemblies within respective seal chamber means, said secondary seal retainer means providing connection with the respective actuator means thereof.

15. Apparatus as recited in claim 1, including:
(a) a cup pig retrieval barrel oriented in generally horizontal position and having a quick opening closure at the free extremity thereof, said cup pig retrieval barrel having an internal dimension greater than the external dimension of cup pigs passing through said pipeline thus permitting fluid flow past cup pigs present therein;
(b) an eccentric pig separator being coupled to said pipeline and being operative to separate cup pigs from fluid flowing through said pipeline and to direct the cup pigs toward said cup pig retrieval barrel;
(c) an isolation valve interconnecting said eccentric pig separator and said cup pig retrieval barrel and functioning to isolate said cup pig retrieval barrel from the fluid pressure of said pipeline:
(d) means causing a part of the fluid flowing through said pipeline to flow through said cup pig retrieval barrel; and
(e) means for selectively communicating the fluid pressure of said pipeline into said cup pig retrieval barrel with said isolation valve in the closed position thereof.

16. Apparatus as recited in claim 1, including means for selectively manually and automatically controlling said holding and launching rams for pig launching operations.

17. Apparatus for launching cup pigs into a pipeline, comprising:
(a) a generally vertically oriented straight launching barrel of a height sufficient to contain a plurality of cup pigs, said launching barrel having an internal diameter greater than the internal diameter of the pipeline;
(b) an isolation valve connected to said launching barrel and having a flow port of substantially the same internal dimension as said launching barrel;
(c) a holding ram located intermediate the upper and lower extremities of said launching barrel and being movable to a pig holding position within said launching barrel and a pig release position permitting downward movement of cup pigs within said launching barrel;
(d) a launching ram located between said holding ram and said isolation valve and being spaced below said launching ram sufficiently that a single cup pig will be received between said holding ram and launching ram, said launching ram being movable to an extended position blocking downward movement of a cup pig within said launching barrel and a retracted position permitting downward movement of cup pigs;
(e) a substantially vertical pipe section located below and in substantially coaxial relation with said isolation valve and having substantially the same internal dimension as said launching barrel;
(f) a pipe tee coupled in fluid receiving relation with said pipeline and forming a vertically oriented passage of substantially the same internal diameter as said pipe section combining a launched cup pig into fluid flowing from said pipeline and permitting fluid pressure induced transport of said cup pig through said pipeline; and
(g) a generally vertically oriented frusto conical pipe reducer extending downwardly from and in coaxial relation with said pipe section and having its small extremity coupled with a substantially vertically oriented portion of said pipeline.

18. Apparatus as recited in claim 17, including means indicating passage of a cup pig from said launching barrel into said pipeline.

* * * * *